A. C. BELT.
Cultivator.

No. 70,785 Patented Nov 12, 1867.

WITNESSES:
Alex Mahon
Hobart H. Smith

INVENTOR:
Alfred C. Belt
per
A. M. Smith
atty.

United States Patent Office.

ALFRED C. BELT, OF GORESVILLE, VIRGINIA.

Letters Patent No. 70,785, dated November 12, 1867.

IMPROVEMENT IN CULTIVATOR.

The Schedule referred to in these Letters Patent and making part of the same.

TO ALL WHOM IT MAY CONCERN:

Be it known that I, ALFRED C. BELT, of Goresville, Loudon county, Virginia, have invented certain new and useful Improvements in Cultivators; and I do hereby declare the following to be a full, clear, and exact description thereof, reference being had to the annexed drawings, and to the letters and figures of reference marked thereon, and making a part of this specification, in which—

Figure 1:
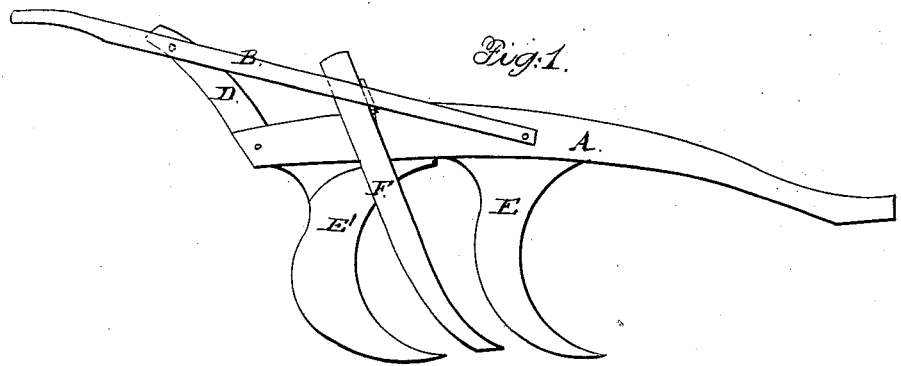
Figure 1 is a side elevation taken from the right-hand side.

My invention consists in the employment of cultivator-teeth arranged in reversed positions, that is to say, having their mould-boards and land-sides arranged upon opposite or reversed sides relative to the plough, as hereinafter explained; also in perforating the mould-board to any desired extent, and with perforations of any desired or convenient size, for the purpose of forming a sifter mould-board; and in the employment, in combination with the reversed cultivator-teeth, of an adjustable coulter, as hereinafter described.

To enable others to construct and use my invention, I will proceed to describe the same with reference to the drawing, in which—

Figure 2:
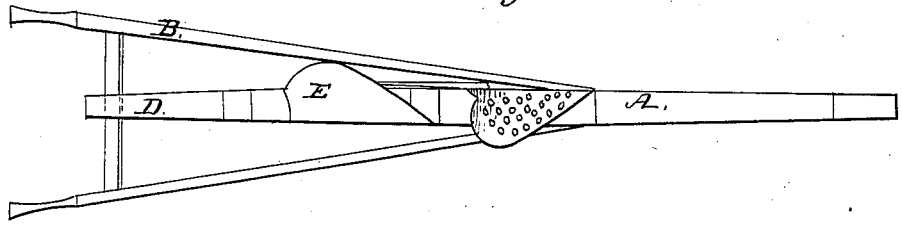
Figure 2 is a bottom view of a cultivator embracing my improvement.
Figure 4:
Figure 3:
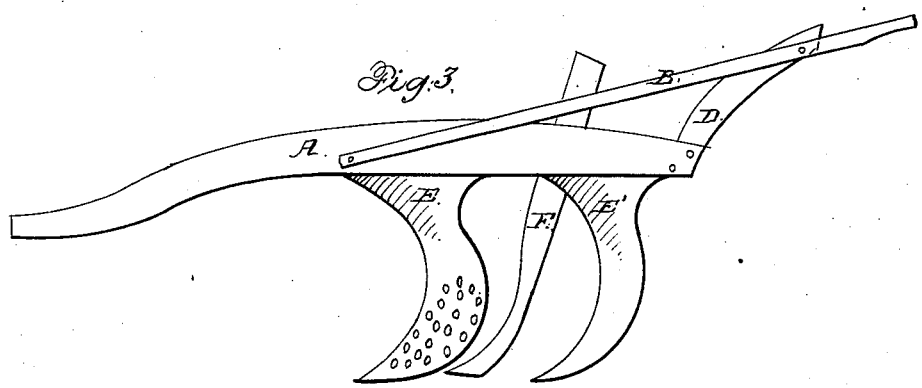
Figure 3 is a side elevation taken from the opposite or left-hand side.

A represents the cultivator-beam, made in any desired or usual form, and provided with handles B B, secured thereto and to the cross-piece or bar C of the upright D, as shown by the drawing, or in any other suitable or convenient manner. The under surface of the beam should be grooved, as represented in sectional view, fig. 4, to receive the head or flanges formed upon the cultivator-teeth, for the purpose hereinafter described. E E' are the cultivator-teeth, made by preference in the form shown in the drawing, though any suitable or usual form may be given thereto. By the form and construction shown, the forward cutting edge, at the junction of the mould-board and land-side of the plough or tooth, is made to extend from the point rearward, upward, and forward to, or nearly to, the beam A, and the tooth is expanded at its top, in front and rear, in such manner as to form flanges through which the tooth is bolted or otherwise secured to the beam. The curvature given to the mould-board is such as to avoid the formation of any concavity therein in the line of its action upon or resistance to the soil in which the tooth operates, in which the earth may lodge and clog the tooth; in other words, the concave lines are in a direction, either vertical, or approaching thereto, while lines drawn upon the surface of the mould-board, in the path of the passage of the earth over the same in the forward motion of the tooth, are made either right or slightly convex, for the purpose stated. The mould-board may be provided with any suitable number of horizontal perforations, in the manner shown in figs. 2 and 3. These perforations may vary in size and number according to the character of the soil in which the plough or cultivator is intended to operate, and are designed to form a sieve or sifter-plough or mould-board for the more effectual breaking up and pulverizing of the soil, and will be found of especial advantage in cloddy ground, or wherever roots abound, which, but for the pulverizing and separating action of the perforated mould-board, tend to tie or bind the soil in lumps or clods. These teeth, of which there may be any desired number, are arranged in rows, with the mould-boards of the alternate teeth reversed or facing to the opposite sides of the plough or cultivator, in the manner represented by the drawing; and where used in this manner, only the forward mould-board, or mould-boards, where more than one series is used, need be perforated. The object of this reversed arrangement of the teeth is to effect a more thorough breaking up and cultivation of the soil, and for this purpose the arrangement of the teeth should be such that a horizontal line drawn on the face of the land-side of the advance tooth will intersect the mould-board next in rear, at or near midway of its width, though this relation may be varied as the character of the soil or the judgment of the builder may dictate. F is an adjustable coulter working in a groove or slot formed in the beam, and arranged between the teeth in the manner shown in the drawing. This coulter is made vertically adjustable in such manner as to regulate by its adjustment the depth of the furrow, and may be of any desired or usual form.

The advantages of the reverse perforated cultivator may be briefly stated as follows, viz: Its adaptation to ploughing closely to the hills or rows of plants without covering them over, and the cutting and pressing away from the hills of all grass, weeds, and clods, while at the same time sifting the fine earth which is taken up by the rear cultivator-tooth, freed from trash or clods for the perfect hilling up of any planted vegetation. One advantage of the sifter is the removal of the roots of weeds and vines, of such nature as vegetate from the root as well as the seed, the roots being moved away from the place of the plant. The furrow is freed from vegetation except such as is planted in it, which being surrounded by pulverized earth is rendered easy of cultivation. It will also be found of service in the preparation of furrows for the planting and drilling of all kinds of seeds.

Having now described my invention, I desire to state that in the construction of the perforated sifter mould-board, I do not wish to be understood as limiting my claim to its use in cultivator-teeth, as it will be obvious that it may be readily applied to ploughs of any usual or ordinary construction, and will be found to operate upon the same principle and to possess the same functions.

What I claim, and desire to secure by Letters Patent, is—

1. The reversed arrangement of the alternate teeth of the cultivator, as described.

2. The cultivator-teeth arranged in reversed positions, as described, in combination with the adjustable coulter.

3. The grooved or recessed beam, in combination with the flanged teeth secured thereto, as described.

4. The forward tooth, provided with the perforated sifter mould-board, in combination with a following tooth having the reversed arrangement described, for the purpose set forth.

ALFRED C. BELT.

Witnesses:
   I. VANDEVENTER,
   JOHN GRAY.